United States Patent
Sekine et al.

(10) Patent No.: US 7,489,954 B2
(45) Date of Patent: *Feb. 10, 2009

(54) WIRELESS COMMUNICATION APPARATUS AND METHOD OF WIRELESS COMMUNICATION

(75) Inventors: Syuichi Sekine, Kanagawa-Ken (JP); Mutsumu Serizawa, Tokyo (JP); Hiroki Shoki, Kanagawa-Ken (JP); Hiroshi Tsurumi, Kanagawa-Ken (JP); Shuichi Obayashi, Fort Lee, NJ (US); Kiyoshi Toshimitsu, Kanagawa-Ken (JP); Tomoko Adachi, Kanagawa-Ken (JP); Tsuguhide Aoki, Kanagawa-Ken (JP); Ren Sakata, Kanagawa-Ken (JP); Ryoko Matsuo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/867,906

(22) Filed: Oct. 5, 2007

(65) Prior Publication Data
US 2008/0032757 A1    Feb. 7, 2008

Related U.S. Application Data

(63) Continuation of application No. 10/422,699, filed on Apr. 25, 2003.

(30) Foreign Application Priority Data
Apr. 30, 2002    (JP) .............................. 2002-128179

(51) Int. Cl.
    *H04M 1/00*    (2006.01)
(52) U.S. Cl. ................. 455/575.2; 455/183.2; 455/517; 455/513; 455/510; 455/118; 455/127.3; 455/95; 455/82

(58) Field of Classification Search ............. 455/575.2, 455/183.2, 517, 513, 510, 118, 127.3, 95, 455/82

See application file for complete search history.

(56) References Cited

U.S. PATENT DOCUMENTS

| 4,914,714 | A | 4/1990 | Tamura |
| 5,276,920 | A | 1/1994 | Kuisma |
| 6,006,117 | A | 12/1999 | Hageltorn et al. |
| 2002/0107041 | A1 | 8/2002 | Mori |

FOREIGN PATENT DOCUMENTS

| JP | 6-90227 | 3/1994 |
| JP | 10-107685 | 4/1998 |
| JP | 2001-189971 | 7/2001 |

*Primary Examiner*—Quynh H Nguyen
(74) *Attorney, Agent, or Firm*—Oblon, Spivak, McClelland, Maier & Neustadt, P.C.

(57) ABSTRACT

One of objects of a wireless communication apparatus according to the present invention is to realize stable communication regardless of received signal strength indication and information amount. The wireless communication apparatus for communicating in an autonomous distributed wireless network includes a detection unit which generates a detection signal by detecting a first wireless signal from a first wireless apparatus; a wireless circuit which receives a second wireless signal relating to said first wireless signal, transmitted from a second wireless apparatus which received said first wireless signal; a signal estimation unit which estimates said detection signal and the received second wireless signal; a signal selector which selects either said detection signal or the received second wireless signal, based on an estimation result of said signal estimation unit; and a demodulator which demodulates the signal selected by said signal selector.

5 Claims, 11 Drawing Sheets

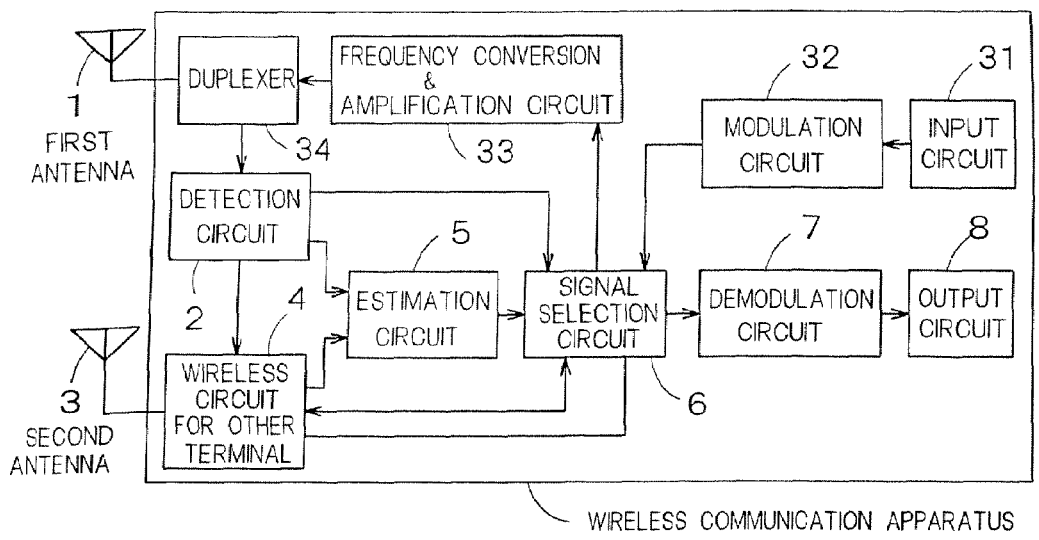
F I G. 15
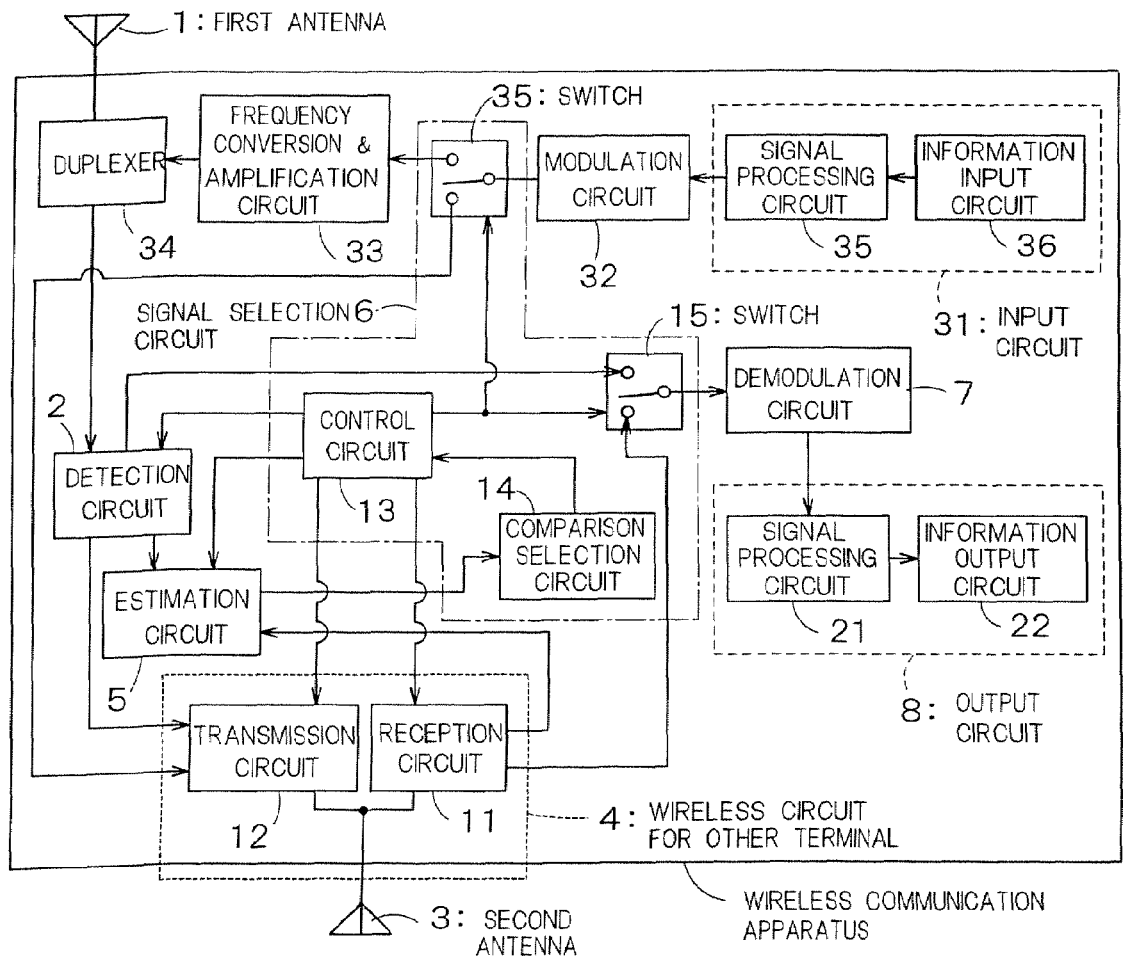
F I G. 16

WIRELESS COMMUNICATION APPARATUS AND METHOD OF WIRELESS COMMUNICATION

CROSS REFERENCE TO RELATED APPLICATIONS

This application is a continuation of and claims the benefit of priority under 35 U.S.C. § 120 from U.S. Ser. No. 10/422,699, filed Apr. 25, 2003, and claims the benefit of priority under 35 U.S.C. § 119 from Japanese Patent Application No. 2002-128179, filed on Apr. 30, 2002, the entire contents of which are incorporated by reference herein.

BACKGROUND OF THE INVENTION

1. Field of the Invention

The present invention relates to a wireless communication apparatus having a plurality of antennas and a method of wireless communication.

2. Related Art

Conventional wireless apparatuses perform a diversity or have a smart antenna composed of an antenna on a single terminal or a mobile station, in order to reduce influence of fading seen as a problem of mobile communication. In this case, a plurality of antennas are necessary, and the antennas have to be disposed separate from each other by a prescribed distance, in order to obtain desirable properties which are omnidirectional and noncorrelated. Because of this, in most cases, it is impossible to realize the desirable properties in the terminal and the mobile station which have a limitation to body size.

The size of the antenna may become large according to frequencies, in order to realize the antenna which ideally operates. If an antenna with small size is used, desirable properties of the antenna will not be obtained.

As a method of solving these problems, techniques in which wireless terminals are connected to an autonomous distributed wireless network that does not need access points, and the diversity is performed by combining reception signals with each other is disclosed in Japanese patent Laid-open Pub. No. 2001-189971.

In the conventional techniques, however, all the reception signals are transmitted between the terminals. Because of this, if information amount of the reception signals is large, huge load is added to the autonomous distributed wireless network. For example, when a data of moving images are received, communication has to be performed at a transmission speed of about several hundred kilometers in the autonomous distributed wireless network. When such signals are simultaneously transmitted between a plurality of terminals, congestion occurs, it becomes impossible to communicate between the terminals within a desirable time, and diversity reception originally intended may become impossible.

SUMMARY OF THE INVENTION

An object of the present invention is to provide a wireless communication apparatus and a method of wireless communication capable of stably communicating, regardless of received signal strength indication and information amount.

According to the present invention, a wireless communication apparatus for communicating in an autonomous distributed wireless network, comprising:

a detection unit which generates a detection signal by detecting a first wireless signal from a first wireless apparatus;

a wireless circuit which receives a second wireless signal relating to said first wireless signal, transmitted from a second wireless apparatus which received said first wireless signal;

a signal estimation unit which estimates said detection signal and the received second wireless signal;

a signal selector which selects either said detection signal or the received second wireless signal, based on an estimation result of said signal estimation unit; and a demodulator which demodulates the signal selected by said signal selector.

BRIEF DESCRIPTION OF THE DRAWINGS

FIG. 15 is a block diagram in the case where a transmission system is added to FIG. 1.

FIG. 16 is a block diagram showing a detailed internal configuration of FIG. 15.

DESCRIPTION OF THE PREFERRED EMBODIMENTS

Hereinafter, a wireless communication apparatus and a method of wireless communication will be more specifically described with reference to drawings.

First Embodiment

Figure 1:
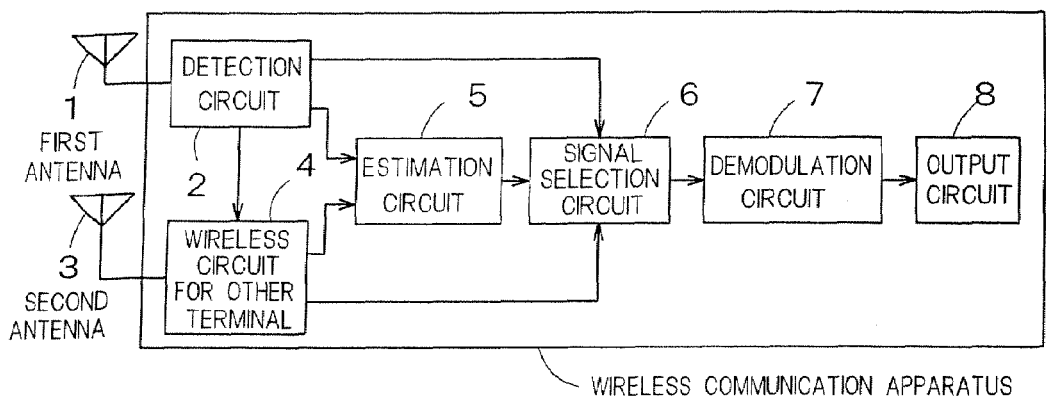
FIG. 1 is a diagram showing a first embodiment of a wireless communication apparatus according to the present invention.

FIG. 1 is a block diagram showing schematic configuration of a first embodiment of a wireless communication apparatus according to the present invention. The wireless communication apparatus of FIG. 1 shows one example of a wireless terminal capable of forming an autonomous distributed wireless network with other wireless terminals hereinafter, called as first and second terminals as shown in FIG. 2.

Figure 2:
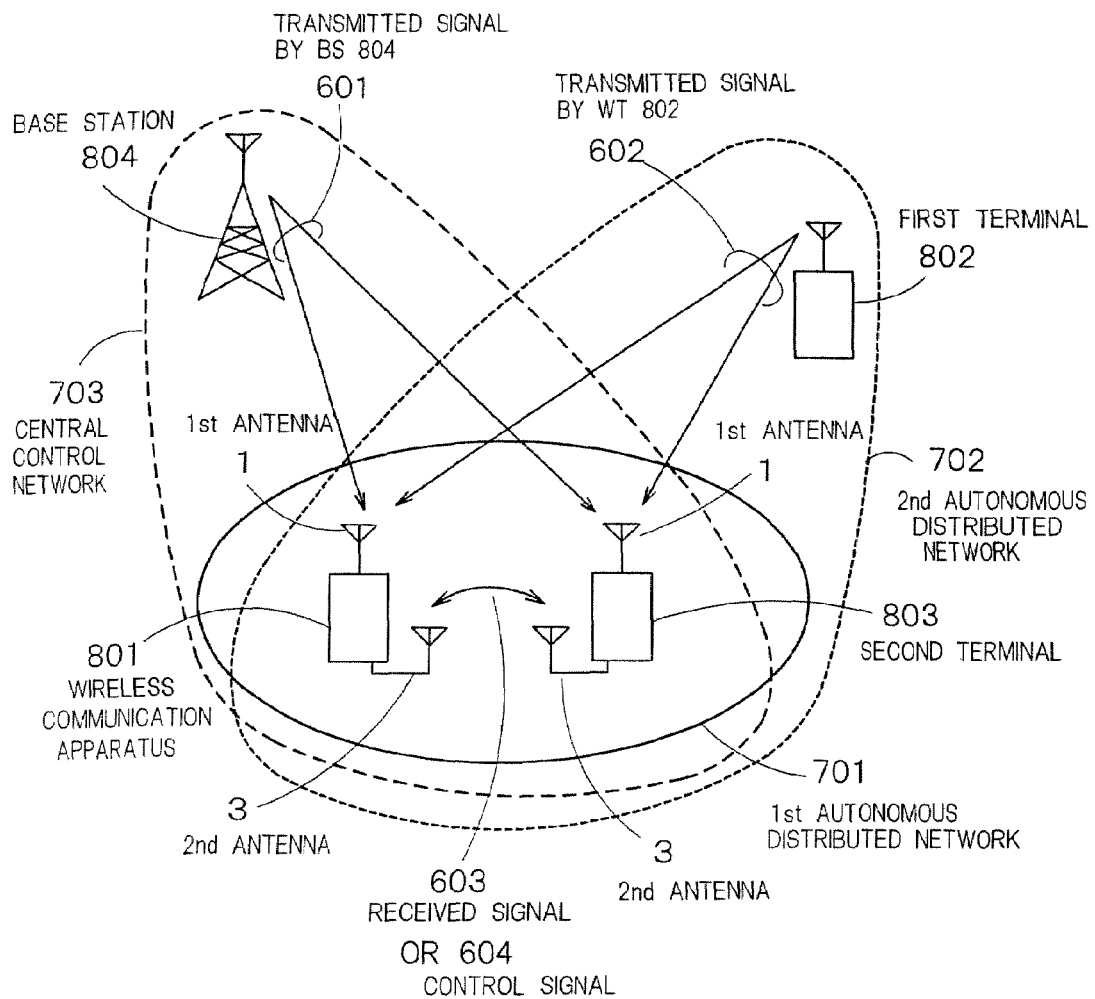
FIG. 2 is a conceptual figure showing the relationship among the wireless communication apparatus, a first terminal and a second terminal.

FIG. 2 shows a relationship of the above mentioned wireless communication apparatus, first terminal and second terminals. The wireless communication apparatus denoted as reference number 801 and second terminal denoted as reference number 803 form first autonomous distributed wireless network 701. The wireless communication apparatus 801 and second terminal 803 form second autonomous distributed wireless network 702 with first terminal denoted as reference number 802. The wireless communication apparatus 801 and second terminal 803 belong to the central control network 703 such as cellular network, which is controlled by the base station 804.

Wireless communication apparatus 801 and second terminal 803 receive the same signal 602, which is transmitted from first terminal 802 through second autonomous distributed wireless network 702. Wireless communication apparatus 801 and second terminal 803 receive the same signal 601, which is transmitted from base station 804 through the central control network 703. Wireless communication apparatus 801 and second terminal 803 can transmit the control signal 604 or the received signal 603 from first terminal 802 and base station 804 through first autonomous distributed wireless network 701.

First terminal 802 can be replaced by base station 804. The base station 804 can perform the same role as first terminal 802 if wireless communication apparatus 801 and second terminal 803 are in the network 703.

The autonomous distributed wireless network is a network such as a wireless LAN, and is composed of only terminals (such as a PC, a PDA and a cellular phone) capable of connecting each other by wireless signal. First autonomous distributed wireless network 701 can be wireless LAN. Second autonomous distributed wireless network 702 can be the Bluetooth network, and vice versa. The wireless communication apparatus of FIG. 1 has a first antenna 1, a detection circuit 2, a second antenna 3, a wireless circuit for other terminal 4 for the autonomous distributed wireless network, an estimation circuit 5, a signal selection circuit 6, a demodulation circuit 7 and an output circuit 8.

The first antenna 1 can receive the signal from the base station of the central control network and the other terminal, which is forming the autonomous distributed wireless network. Here, the first antenna 1 receives the wireless signal from the first terminal. The detecting circuit 2 eliminates a carrier signal from a high frequency signal received by the first antenna 1 in order to convert into a modulation signal.

The second antenna 3 can transmit and receive the wireless signal between the base station of the central control network and the other terminal, which is forming a part of the autonomous distributed wireless network. The second antenna 3 transmits and receives the wireless signal from/to the second terminal. The second terminal receives the wireless signal from the first terminal, and transmits the received wireless signal. The transmission signal from the second terminal is received by the second antenna 3. The wireless circuit for other terminal 4 can receive the signal transmitted from the second terminal. The wireless circuit for other terminal 4 can transmit the signal detected by the detection circuit 2 to the second terminal. The second terminal is constituted in the same way as the wireless communication apparatus of FIG. 1.

The estimation circuit 5 estimates the detection signal detected by the detection circuit 2 and the reception signal by the wireless circuit for other terminal 4. For example, a received signal strength indication generally used for the cellular phone such as a CDMA system or a PDC system is used as an estimation function. The received signal strength indication is estimated based on an average value within a constant time period of an envelope curve amplitude of the detection signal and the reception by the wireless circuit for other terminal 4.

The signal selection circuit 6 selects either the detection signal detected by the detection circuit 2 or the reception signal by the wireless circuit for other terminal 4. The demodulation circuit 7 generates the demodulation signal obtained by demodulating the signal selected by the signal selection circuit 6, that is, an information signal such as sound and image. The information signal is outputted from the output circuit 8.

Figure 3:
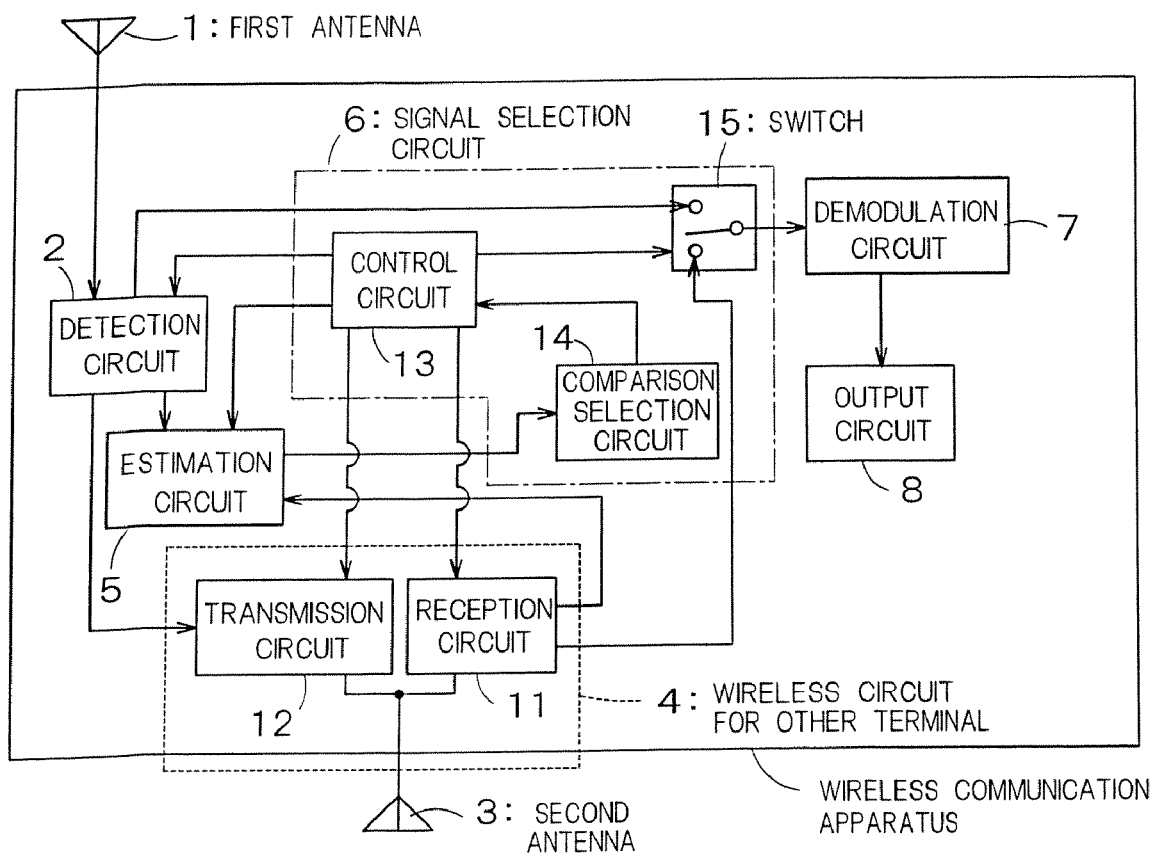
FIG. 3 is a block diagram showing a detailed internal configuration of the wireless communication apparatus of FIG. 1.

FIG. 3 is a block diagram showing detailed internal configurations of the wireless circuit for other terminal 4 and the signal selection circuit 6. More specifically, FIG. 3 shows internal configurations of the wireless circuit for other terminal 4 and the signal selection circuit 6.

The wireless circuit for other terminal 4 has a reception circuit 11 and a transmission circuit 12 which are connected to the second antenna 3, respectively. The transmission circuit 12 transmits the detection signal detected by the detection circuit 2 to the second terminal. The reason why the detection signal is transmitted to the second terminal is because it is possible to allow the information received by the first terminal to use for the second terminal. The transmission circuit 12 may transmit the information only when the second terminal has performed transmission request. The wireless signal transmitted from the second terminal is received by the reception circuit 11 in the wireless circuit for other terminal 4. The reception circuit 11 detects the reception signal from the second terminal and supplies the detection signal to the estimation circuit 5 and the signal selection circuit 6.

The signal selection circuit 6 has a control circuit 13, a comparison selection circuit 14 and a switch 15. The control circuit 13 controls each part of the wireless communication apparatus of FIG. 1 as described below.

The comparison selection circuit 14 selects either of the detection signal detected by the detection circuit 2 or the reception signal by the wireless circuit for other terminal 4, based on the estimation result of the estimation circuit 5, and notifies the control circuit 13 of the selection result. The comparison selection circuit 14 has a buffer or a memory not shown which accumulates the estimation result transmitted from the estimation circuit 5 at a certain time difference.

The switch 15 selects either of the detection signal detected by the detection circuit 2 or the reception signal by the wireless circuit for other terminal 4 and supplies the selected signal to the demodulation circuit 7. In FIG. 3, although the switch 15 is conceptually shown, the buffer or the memory may be practically provided. The reason why the buffer or the memory is provided is because the signal from the detection circuit 2 are transmitted at a certain timing different from the signal from the wireless circuit for other terminal 4. The signal from the detection circuit 2 has to be stored in order to turn on/off the switch 15 one after another. When a plurality of terminals cooperatively receive the signal, the signal transmitted from these terminals has to be stored. Even in this case, the switch 15 has to have a function of the buffer or the memory. On the other hand, when the switch 15 is turned on/off by skipping instead of sequential comparison, the buffer or the memory becomes unnecessary.

Figure 4:
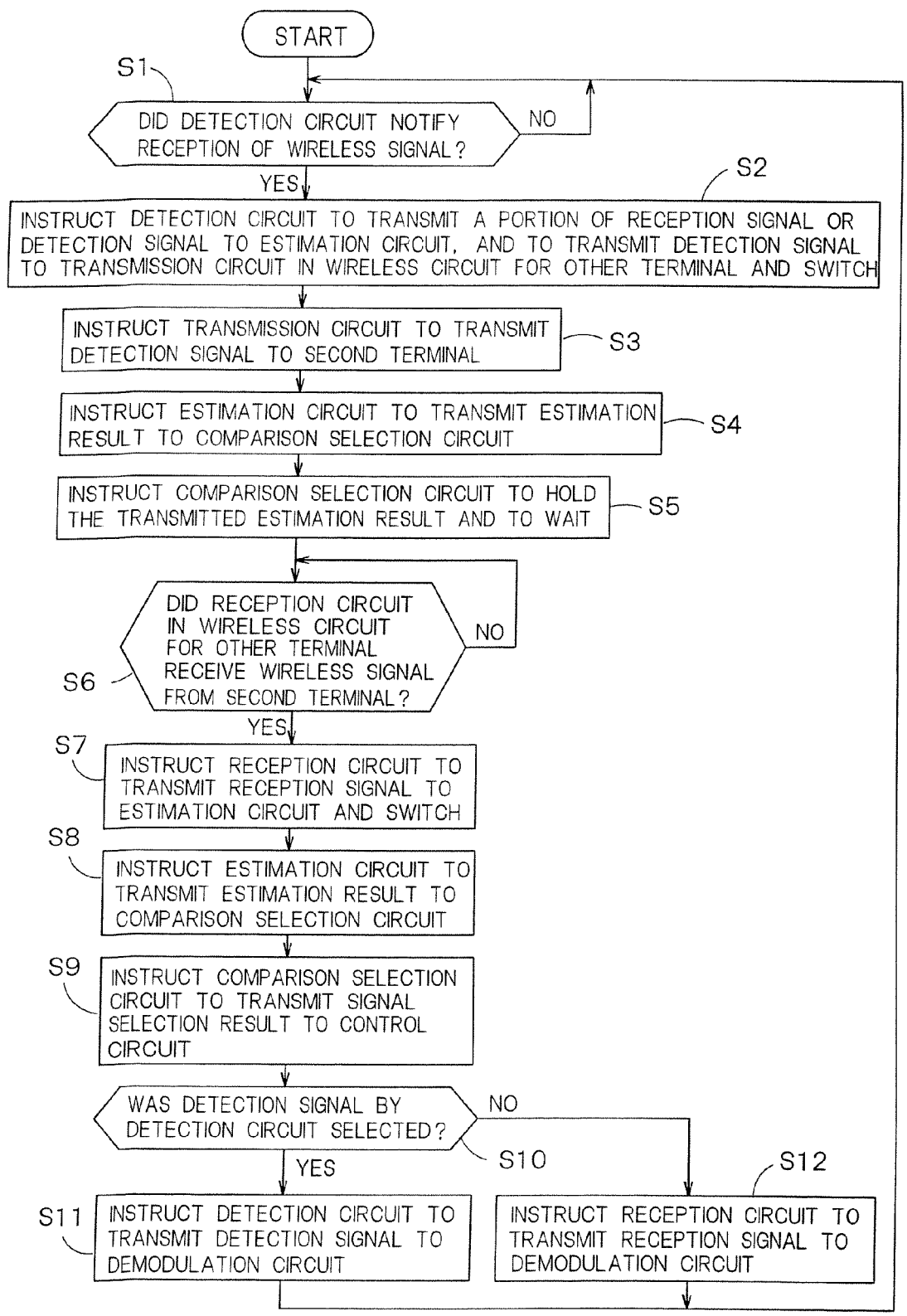
FIG. 4 is a flowchart showing processing operation of a first embodiment.

FIG. 4 is a flowchart showing processing operations of the first embodiment. Hereinafter, operations of the wireless communication apparatus of the present embodiment will be described with reference to this flowchart. Here, as a matter of convenience of explanation, an example of coordinating two terminals is described. However, the number of the terminals is not limited to two. Even if the number of the terminals increases, the basic operations are the same as those of FIG. 4.

The wireless communication apparatus of FIG. 1 establishes the wireless communication network with the second terminal by using the wireless circuit for other terminal 4. The wireless communication apparatus of FIG. 1 makes an agreement in which the second terminal receives the same wireless signal transmitted from the first terminal denoted as 802 in FIG. 2, and/or the base station 804. This agreement is made through the established wireless communication network 701 shown in FIG. 2. It is decided that the signal received by each terminal in transmitted to the other terminal. The contents of the transmitted signal (such as the detection signal or the signal after demodulation) are decided to each other beforehand. After then, the wireless communication apparatus and second terminals begin communication with the base station and/or the other terminal such as first terminal.

The processing operation of the wireless communication apparatus of the present embodiment will be described. It is determined whether or not the detection circuit 2 has notified the control circuit 13 of reception of the wireless signal (step S1).

The control circuit 13 instructs the detection circuit 2 to transmit a portion of the reception signal or the detection signal detected by the detection circuit 2 to the estimation circuit 5, and instructs the detection circuit 2 to transmit the detection signal to the transmission circuit 12 in the wireless circuit for other terminal 4 and the switch 15 (step S2).

The control circuit 13 instructs the transmission circuit 12 in the wireless circuit for other terminal 4 to transmit the detection signal to the second terminal (step S3).

When the estimation result of the detection signal is obtained by the estimation circuit 5, the control circuit 13 instructs the estimation circuit 5 to transmit the estimation result to the comparison selection circuit 14 (step S4). The control circuit 13 instructs the comparison selection circuit 14 to hold the transmitted estimation result and to wait (step S5).

The control circuit 13 determines whether or not the reception circuit in the wireless circuit for other terminal 4 has received the wireless signal from the second terminal (step S6). If the wireless signal has been received, the control circuit 13 instructs the reception circuit 11 to transmit the reception signal to the estimation circuit 5 and the switch 15 (step S7).

When the estimation result of the reception signal by the reception circuit 11 is obtained by the estimation circuit 5, the control circuit 13 instructs the estimation circuit 5 to transmit the estimation result to the comparison selection circuit 14 (step S8).

The comparison selection circuit 14 selects, for example, the signal with stronger signal strength indication, among the detection signal detected by the detection circuit 2 and the reception signal by the reception circuit 11. When the comparison selection circuit 14 performed signal selection, the control circuit 13 instructs the comparison selection circuit 14 to transmit the result of the signal selection to the control circuit 13 (step S9).

When the detection signal detected by the detection circuit 2 has been selected, the control circuit 13 instructs the switch 15 to transmit the detection signal detected by the detection circuit 2 to the demodulation circuit 7 (steps S10 and S11). When the reception signal by the reception circuit 11 in the wireless circuit for other terminal 4 has been selected, the control circuit 13 instructs the switch 15 to transmit the reception signal of the reception circuit 11 to the demodulation circuit 7 (steps S10 and S12).

The demodulation signal demodulated by the demodulation circuit 7 is transmitted to the output circuit 8, and the signal is displayed in a display apparatus not shown of the wireless communication apparatus of FIG. 1, or outputted by sound from a speaker not shown.

Here, when transmission of the wireless signal from the second terminal is delayed, whether or not to wait the signal is automatically decided by the terminal based on the types of the reception signals (whether or not immediacy is required), or is decided according to will of users (users decide by notifying the delay to the users). The flowchart in this case is shown in FIG. 5.

Figure 5:
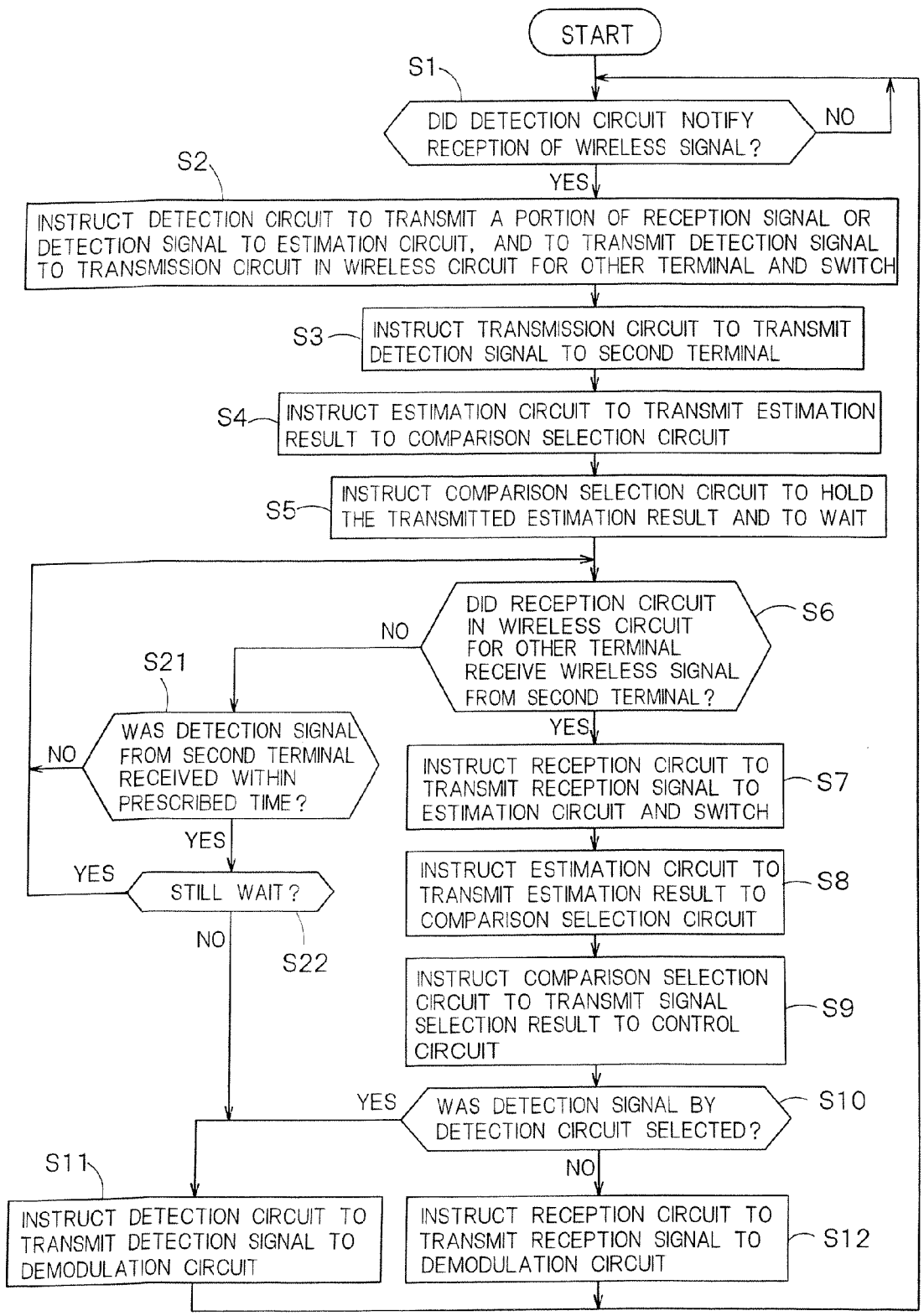
FIG. 5 is a flowchart of a modified example of FIG. 4.

In the flowchart of FIG. 5, steps S21 and S22 are added to the flowchart of FIG. 4. It is determined whether or not the reception circuit 11 has received the signal from the second terminal within a prescribed time period (step S21). When the signal is not received even if the prescribed time period has passed, it is determined whether or not to wait yet (step S22). When it is determined not to wait, the processing of step S11 is performed. In this processing, the detection circuit 2 is instructed to transmit the detection signal to the demodulation circuit 7.

According to the first embodiment, a so-called switching diversity is performed. In this switching diversity, the first and second terminals coordinate and the wireless signal of the terminal having better reception sensitivity is selectively demodulated. Because of this, as compared with the case of performing a combining diversity, it is possible to simplify internal configurations of the wireless communication apparatus, thereby downsizing the apparatus and reducing power consumption. The reason is because in phase combination required for the combining diversity becomes unnecessary. The wireless communication apparatus suitable for the portable terminal is obtained by using such a switching diversity.

It is known that the switching diversity deteriorates a diversity gain a little bit, as compared with the combining diversity. However, since the amount of the deterioration is a little bit, performance does not change almost at all.

In FIG. 1, although the example in which two antennas 1 and 3 are used has been described, it is possible to perform the same switching diversity as that of FIG. 1, even if there is only one antenna.

Figure 6:
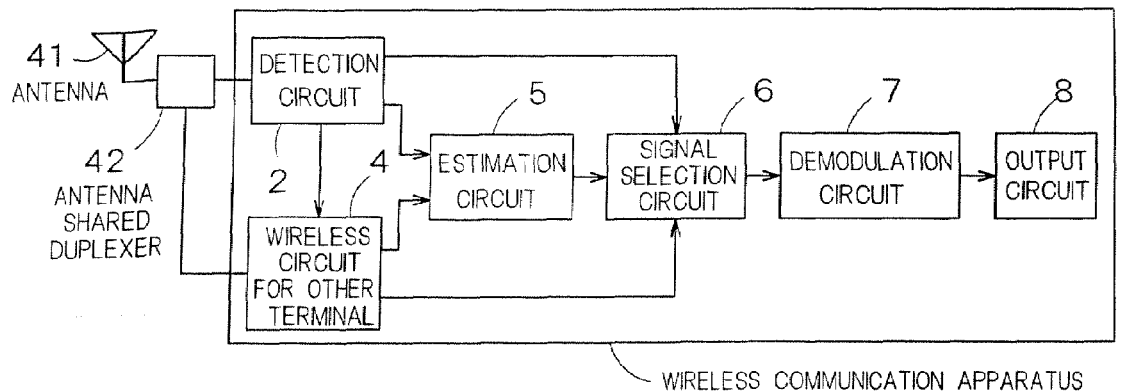
FIG. 6 is a block diagram showing schematic configuration of an embodiment of a wireless communication apparatus having one antenna.

FIG. 6 is a block diagram showing schematic configurations of an embodiment of a wireless communication apparatus having only one antenna 41. The wireless communication apparatus of FIG. 6 has only one antenna 41, and an antenna duplexer 42 for distributing the reception electric wave received by the antenna 41, instead of the first and second antennas 1 and 3. The other configurations are the same as those of FIG. 1.

The antenna 41 of FIG. 6 performs two frequency operations capable of matching with two frequencies. Various Prior Art documents propose the configuration of the antenna 41 which performs two frequency operations, and concrete forms of configurations will not be limited. More specifically, the antenna 41 receives the signal at a frequency band which can be detected by the detection circuit 2 (the signal transmitted from the first terminal) and the signal at a frequency band which can be received by the wireless circuit for other terminal 4 (the signal transmitted from the second terminal).

Figure 7:
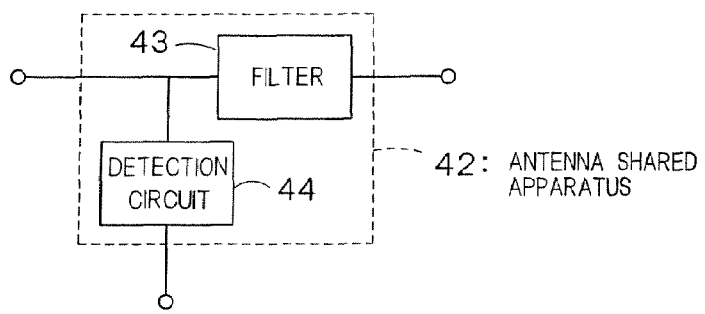
FIG. 7 is a block diagram showing internal configuration of the antenna duplexer.

The antenna duplexer 42 has two filters 43 and 44 passing through only the signals at frequency bands different from each other, as shown in a detail configuration of FIG. 7. The reception signal passing through the filter 43 is inputted to the detection circuit 2, and the reception signal passing through the filter 44 is inputted to the wireless circuit for other terminal 4. Therefore, even if the antenna is one, it is possible to select and demodulate the wireless signal from the terminal with better reception sensitivity by coordinating the first and second terminals.

In the case of configurations of FIG. 6, since it is possible to decrease the number of antennas, as compared with FIG. 1. Because of this, it is possible to downsize the apparatus.

Second Embodiment

One of features of a second embodiment is to perform a switching diversity by estimating a demodulation signal instead of a detection signal.

Figure 8:
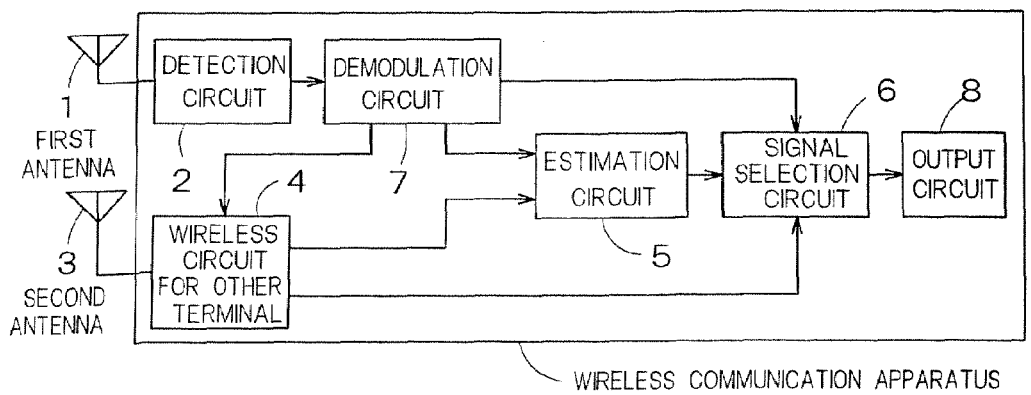
FIG. 8 is a block diagram showing schematic configuration of a second embodiment of a wireless communication apparatus according to the present invention.

FIG. 8 is a block diagram showing schematic configuration of a second embodiment of a wireless communication apparatus according to the present invention.

The wireless communication apparatus of FIG. 8 disposes the demodulation circuit 7 adjacent to the detection circuit 2. The estimation circuit 5 estimates an error rate based on the demodulation signal.

When the reception electric field strength is estimated in the same way as the first embodiment, if there is an interference wave mixed in the same frequency or an adjacent frequency, it is impossible to correctly estimate the signal. On the other hand, when the error rate is estimated in the same way as the second embodiment, even if there is the interference wave mixed in the same frequency or the adjacent frequency, it is possible to correctly estimate the signal. Because of this, it is possible to appropriately select one of the terminal of its own and the other terminals, thereby improving diversity gain.

Although operations of the second embodiment are similar to those of the first embodiment, the followings are different. The wireless communication apparatus of the second embodiment supplies the demodulation signal obtained by demodulating the detection signal to the wireless circuit for other terminal 4, the estimation circuit 5 and the signal selection circuit 6. The estimation circuit 5 estimates the reception signal based on the demodulation signal, and the signal selection circuit 6 selects either of the output of the demodulation circuit 7 or the reception signal of the wireless circuit for other terminal 4 to supply the selected signal to the output circuit 8. The configurations except for the above-mentioned configurations are the same as those of FIG. 1.

According to the second embodiment, because the reception signal is estimated based on the demodulation signal, it is possible to correctly select the signals without being influenced by the interference wave, thereby improving the diversity gain.

Third Embodiment

One of features of a third embodiment requests transmission of the wireless signal from the wireless circuit for other terminal 4 to the second terminal, only when detection signal level estimated by the estimation circuit 5 is less than a prescribed threshold value.

Although the wireless communication apparatus of the third embodiment has the same configuration as that of FIGS. 1 and 2, processing operations are different from the first embodiment.

Figure 9:
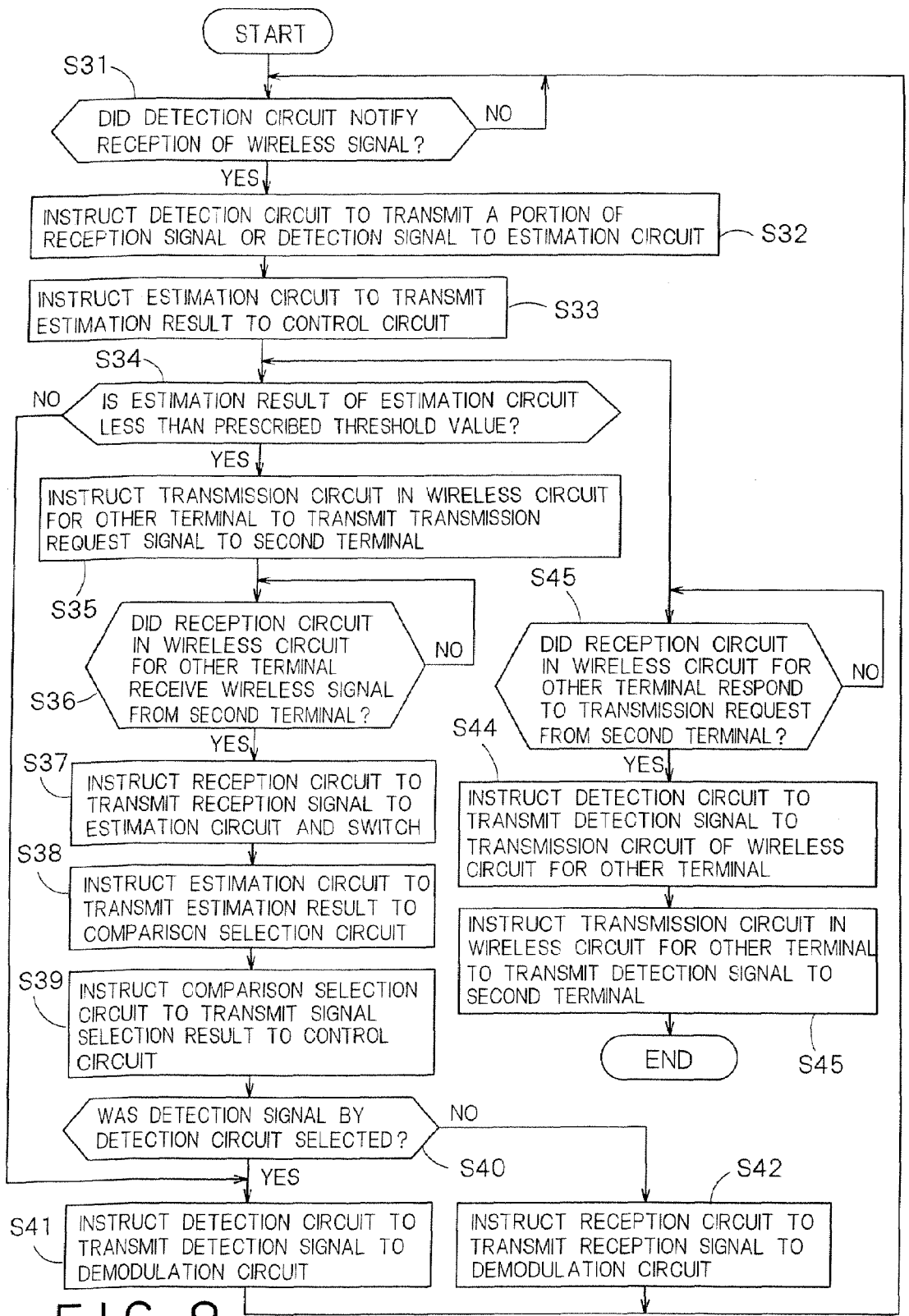
FIG. 9 is a flowchart showing processing operation of a third embodiment of a wireless communication apparatus according to the present invention.

FIG. 9 is a flowchart showing processing operations of the third embodiment of the wireless communication apparatus according to the present invention. Hereinafter, processing operations different from the first embodiment will be mainly described.

The first and second terminals transmit the received signals to the wireless communication apparatus only when the wireless communication apparatus of FIG. 1 requests transmission.

It is determined whether or not the detection circuit 2 notified the control circuit 13 of the reception of the wireless signal (step S31).

The control circuit 13 instructs the detection circuit 2 to transmit a portion of the reception signal or the detection signal detected by the detection circuit 2 to the estimation circuit 5 (step S32).

If the estimation result by the estimation circuit is obtained, the control circuit 13 instructs the estimation circuit 5 to transmit the estimation result to the control circuit 13 (step S33).

The control circuit 13 determines whether or not the estimation result transmitted from the estimation circuit 5 is less than a prescribed threshold value (step S34). If the estimation result is less than the threshold value, the control circuit 13 instructs the transmission circuit 12 in the wireless circuit for other terminal 4 to transmit the transmission request signal to the second terminal (step S35).

The same processing as steps S6-S12 of FIG. 4 are performed in steps S36-S42.

If determined that the estimation result is equal to or more than the threshold value in the above-mentioned step S34, the control circuit 13 performs the processing of step S41. That is, the control circuit 13 instructs the switch 15 to transmit the detection signal detected by the detection circuit 2 to the demodulation circuit 7.

On the other hand, the control circuit 13 determines whether or not the reception circuit 11 in the wireless circuit for other terminal 4 received transmission request by the second terminal (step S43). If the control circuit 13 received the transmission request, the control circuit 13 instructs the detection circuit 2 to transmit the detection signal to the transmission circuit 12 in the wireless circuit for other terminal 4 (step S44). Next, the control circuit 13 instructs the transmission circuit 12 in the wireless circuit for other terminal 4 to transmit the detection signal to the second terminal (step S45).

According to the third embodiment, only when the estimation result relating to the reception signal of the first antenna 1 by the estimation circuit 5 is less than the threshold value, the control circuit 13 requests the transmission of the signal for the second terminal. Because of this, it is possible to reduce the amount of communication with the second terminal. That is, if communication status between the first embodiment and the wireless communication apparatus is good, it is unnecessary to perform the diversity. In such a case, the diversity operation is stopped. Therefore, it is possible to reduce the amount of communication with the other terminals, thereby restricting congestion under communication with the terminals, and reducing power consumption of the wireless communication apparatus.

Fourth Embodiment

One of features of a fourth embodiment is to transmit the estimation result of the estimation circuit 5 to the second terminal.

Figure 10:
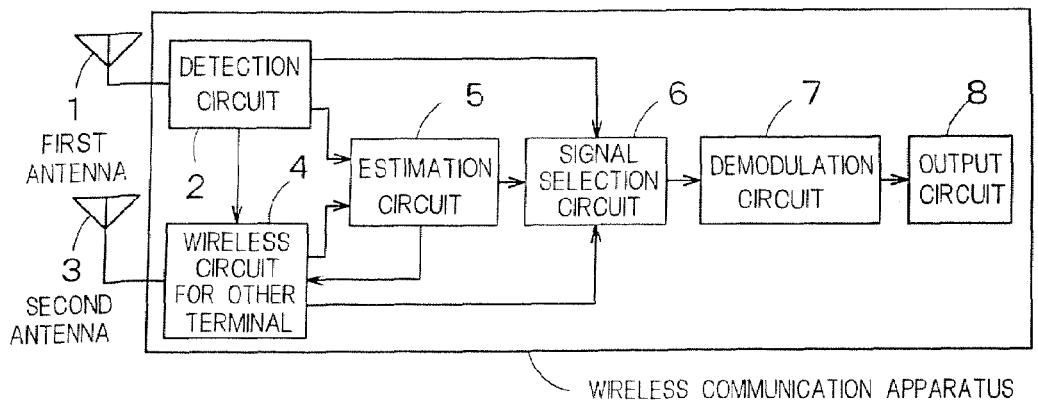
FIG. 10 is a block diagram showing schematic configuration of a fourth embodiment of a wireless communication apparatus according to the present invention.

FIG. 10 is a block diagram showing schematic configuration of a fourth embodiment of a wireless terminal according to the present invention. The wireless communication apparatus of FIG. 10 is different from the first embodiment in which the estimation result of the estimation circuit 5 is transmitted to the second terminal through the transmission circuit 12 in the wireless circuit for other terminal 4.

Figure 11:
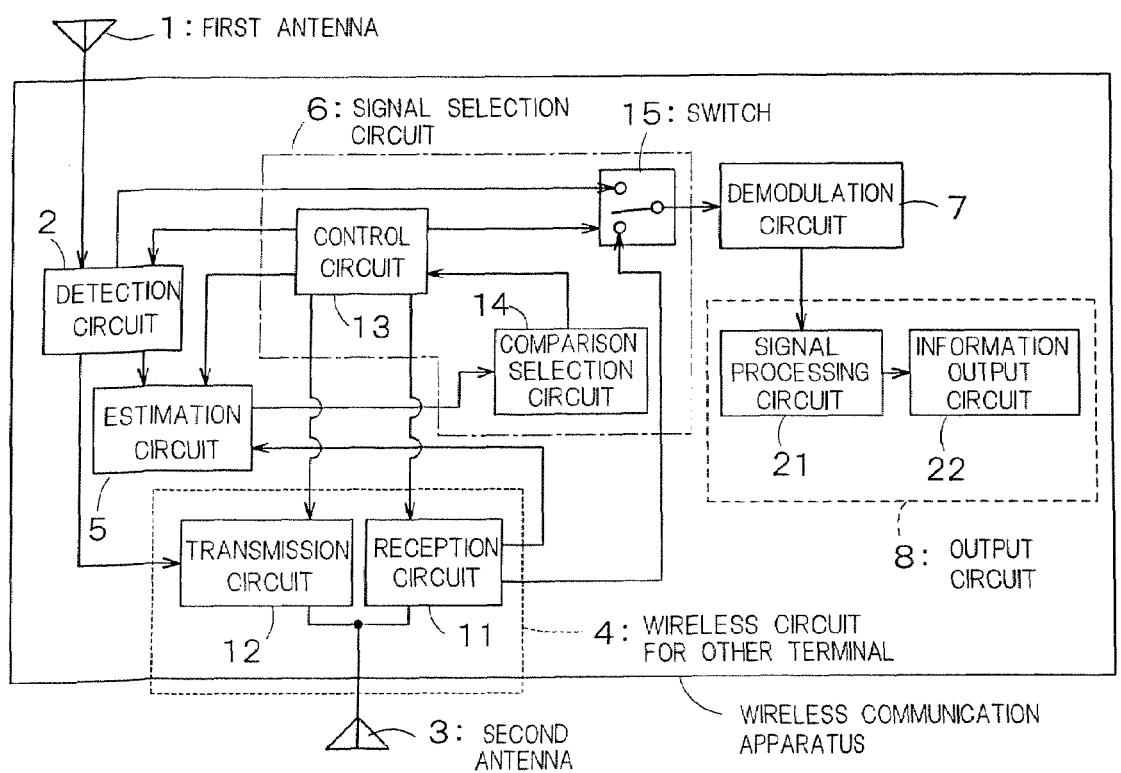
FIG. 11 is a block diagram showing a detailed internal configuration of a wireless communication apparatus of FIG. 10.

FIG. 11 is a block diagram showing detailed internal configurations of the wireless communication apparatus. As compared with FIG. 3, a signal path from the estimation circuit 5 through the transmission circuit 12 in the wireless circuit for other terminal 4 and a signal path from the reception circuit 11 through the comparison selection circuit 14 in the signal selection circuit 6 are added.

Figure 12:
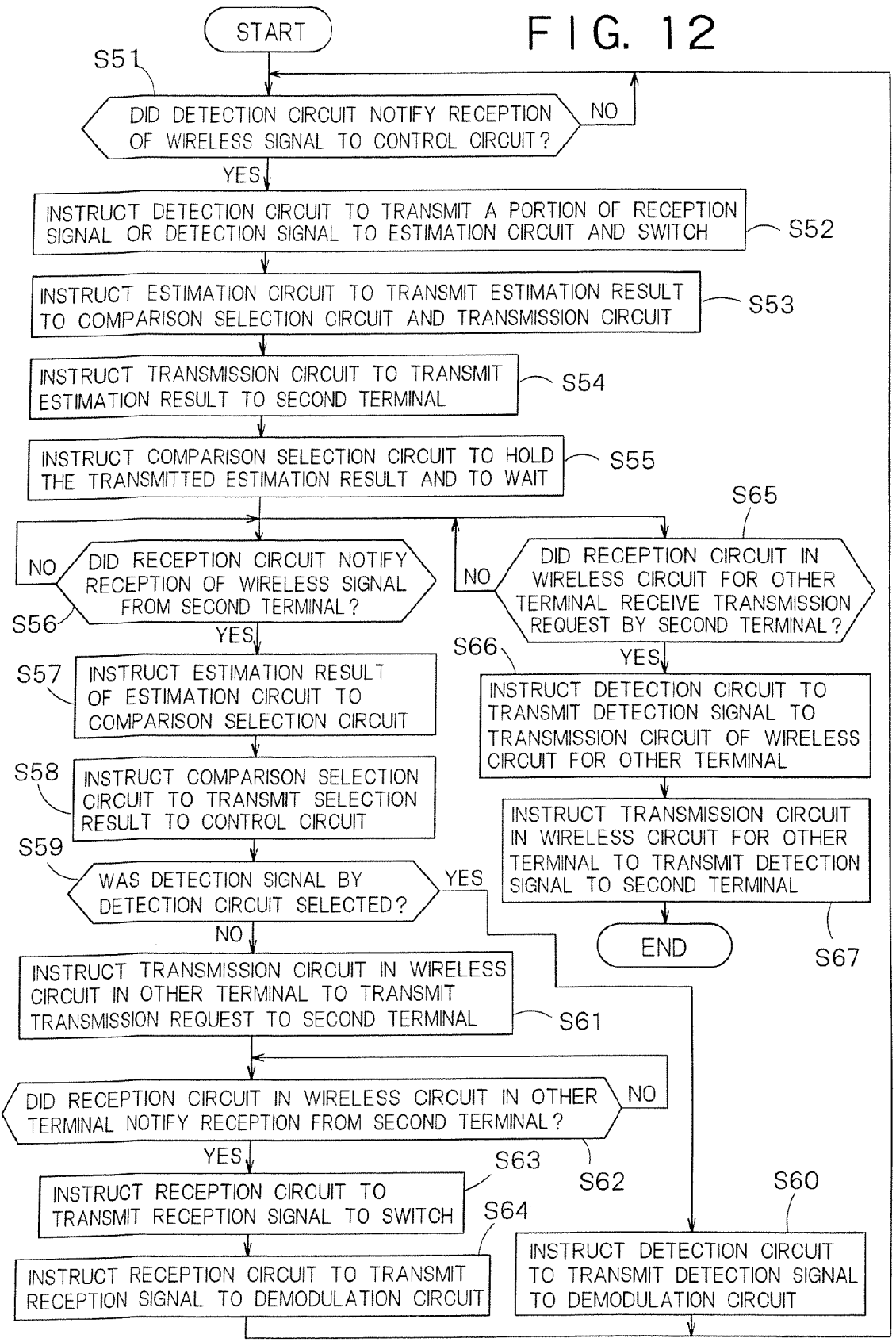
FIG. 12 is a flowchart showing processing operation of a fourth embodiment of a wireless communication apparatus according to the present invention.

FIG. 12 is a flowchart showing processing operations of the fourth embodiment of the wireless communication apparatus according to the present invention. Processing operations of the fourth embodiment will be described based on the flowchart. In the present embodiment, the estimation result of the wireless communication apparatus of FIG. 10 is transmitted to the second terminal, and then the detection signal detected by the detection circuit 2 is transmitted to the second terminal when there is the transmission request from the second terminal.

It is determined whether or not the detection circuit 2 notified the control circuit 13 of the reception of the wireless signal (step S51). The control circuit 13 instructs the detection circuit 2 to transmit a portion of the reception signal or the detection signal to the estimation circuit 5 and the switch 15 (step S52).

If the estimation result of the estimation circuit 5 is obtained, the control circuit 13 instructs the estimation circuit 5 to transmit the estimation result to the comparison selection circuit 14 and the transmission circuit 12 (step S53).

The control circuit 13 instructs the transmission circuit 12 to transmit the estimation result to the second terminal (step S54). The control circuit 13 instructs the comparison selection circuit 14 to hold the transmitted estimation result and to wait (step S55).

It is determined whether or not the reception circuit 11 notified the control circuit 13 of the reception of the wireless signal from the second terminal (step S56). If the reception was notified, the estimation result of the estimation circuit 5 is transmitted to the comparison selection circuit 14 (step S57). If the selection result of the selection circuit 14 is obtained, the control circuit 13 instructs the comparison selection circuit 14 to transmit the selection result (step S58).

The control circuit 13 instructs the switch 15 to select the signal from the detection circuit 2 when it is determined based on the transmitted selection result that the result of the signal detected by itself is good (steps S59 and S60).

On the other hand, when the signal level from the second terminal is larger, the control circuit 13 instructs the transmission circuit 12 in the wireless circuit for other terminal 4 to transmit the transmission request to the second terminal (step S61). After receiving the instruction, the transmission circuit 12 transmits the request signal to the second terminal for requesting the transmission of the wireless signal received from first terminal or the wireless signal received from the base station of the central control network.

The control circuit 13 determines whether or not the reception circuit 11 in the wireless circuit for other terminal 4 notified the reception of the wireless signal from the second terminal (step S62). The control circuit 13 which received the notification instructs the reception circuit 11 to transmit the reception signal to the switch 15 (step S63), and allows the switch 15 to select the reception signal from the second terminal (step S64).

The signal selected by the switch 15 is demodulated by the demodulation circuit 7, and is displayed in a display apparatus that the wireless communication apparatus holds, or is outputted from a speaker.

If there is the transmission request from the second terminal, the control circuit 13 receives the transmission request, and then transmits the detection signal to the second terminal (step S65-S67).

According to the fourth embodiment, since the estimation result of the estimation circuit 5 is transmitted to the second terminal, the second terminal can determine whether or not to receive the signal from the wireless communication apparatus. Therefore, it is possible to reduce unnecessary communication.

According to the fourth embodiment, only when performing the transmission request to second terminal, the wireless communication terminal 801 receives the signal from the second terminal. Because of this, it is possible to reduce the signal amount transmitted and received to/from the second terminal. The signal amount received by the wireless communication apparatus of FIG. 10 from the second terminal decreases, thereby restricting congestion and reducing power consumption.

In the present invention, when there is a plurality of terminals in ad-hoc network (autonomous distributed wireless network), the estimation result is stored in the comparison selection circuit 14 and then compared with each other. By rating the reception level, even if communication becomes impossible in a terminal of a first candidate for any reason (such as under communication with the other terminals, or outside of network area), the transmission request for each terminal is performed in order such as a second candidate and a third candidate. Therefore, it is possible to stably perform the diversity.

Since the second terminal is constituted in the same way as the wireless communication apparatus as described before, the second terminal also can transmit the estimation result estimated by its own to the wireless communication apparatus. If the estimation result transmitted from the second terminal is worse than the estimation result of its own, the transmission circuit 12 may begin transmitting the signal detected by the detection circuit 12.

As the other method, when there is a plurality of terminals in the autonomous distributed wireless network (the ad hoc network) the terminals transmit the estimation result of its own to the other terminals by multicast. The terminal having the highest estimation level transmits the signal from the base station of the central control network to the other terminal by multicast. Therefore, it is possible to reduce useless communication of the signal. As compared with the case where the terminals request the transmission of the signal for the other terminals, it is possible to prevent congestion in the case where one terminal is determined and performs transmission by multicast. Such a rule of the procedure may be chosen by the terminals in the network, after a network between the terminals is established.

Fifth Embodiment

A fifth embodiment is a modified example of the second embodiment. One of features of a fifth embodiment is to transmit the demodulation signal demodulated by the demodulation circuit 7 to the second terminal.

Figure 13:
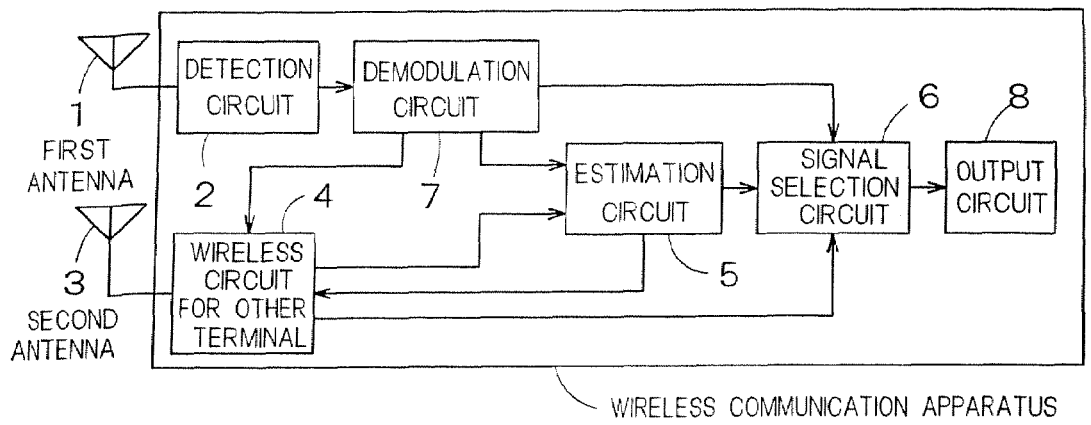
FIG. 13 is a block diagram showing schematic configuration of a fifth embodiment of a wireless communication apparatus according to the present invention.

FIG. 13 is a block diagram showing schematic configuration of the fifth embodiment of a wireless communication apparatus according to the present invention. The wireless communication apparatus of FIG. 13 has almost the same configuration as that of FIG. 8, and is different from that of FIG. 8 in which a signal indicating the estimation result of the estimation circuit 5 is transmitted to the second terminal via the transmission circuit 12 in the wireless circuit for other terminal 4.

According to the fifth embodiment, it is possible to obtain advantageous effects which combine the effects of the second embodiment with the effects of the fourth embodiment. That is, it is possible to select the signal without being influenced by the interference wave signal, and to reduce the signal amount of transmitting and receiving to/from the other terminals.

Sixth Embodiment

One of features of a sixth embodiment is to select either a switching diversity or a combining diversity.

Figure 14:
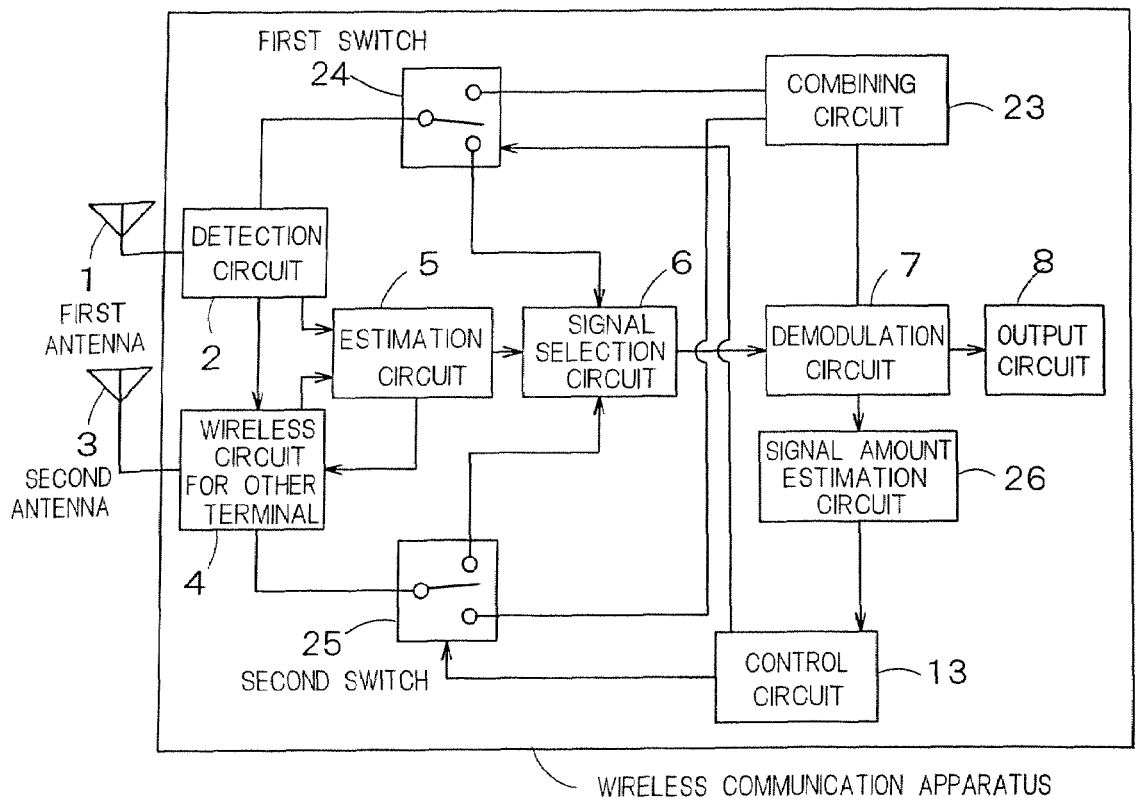
FIG. 14 is a block diagram showing schematic configuration of a sixth embodiment of a wireless communication apparatus according to the present invention.

FIG. 14 is a block diagram showing schematic configurations of a sixth embodiment of a wireless communication apparatus according to the present invention. The wireless communication apparatus of FIG. 14 has a first antenna 1, a detection circuit 2, a second antenna 3, a wireless circuit for other terminal 4, an estimation circuit 5, a signal selection circuit 6, a demodulation circuit 7, an output circuit 8, a control circuit 13, a combining circuit 23, first and second switches 24 and 25, and a signal amount estimation circuit 26.

The signal amount estimation circuit 26 estimates information amount communicated between the terminal and the base station and occurrence time frequency of communication, based on the demodulation signal. The control circuit 13 switches the first and second switches 24 and 25 based on the estimation result of the signal amount estimation circuit 26.

The combining circuit 23 combines the detection signal with the reception signal of the wireless circuit for other terminal 4. The first switch 24 switches whether the detection signal detected by the detection circuit 2 is transmitted to the signal selection circuit 6 for the switching diversity or is transmitted to the combining circuit 23 for the combining diversity. The second switch 25 switches whether the reception signal by the reception circuit 11 in the wireless circuit for other terminal 4 is transmitted to the signal selection circuit 4 for the switching diversity or is transmitted to the combining circuit 23 for the combining diversity.

The control circuit 13 performs the switching diversity by switching the switches 24 and 25 from the combining circuit 23 to the signal selection circuit 6, when it is determined that it would be impossible to do signal processing on time if the combining diversity had been performed, such as the case where there is a large amount of the demodulation signal, or the case where the interval of the occurrence time frequency of the demodulation signal is short.

When it is determined that the it would be impossible to do signal processing on time if the combining diversity had been performed, occurrence of delay may be notified to a user of the terminal via the output circuit 8. If the user had allowed delay, the combining diversity would be continued. If the user had not allowed delay, the switches 24 and 25 would be switched from the combining circuit 23 to the signal selection circuit 6.

Other Embodiment

Even in the above-mentioned second to fifth embodiments, only one antenna may be provided in the same way as the FIG. 6, thereby downsizing the apparatus.

In the above-mentioned embodiments, when communication with terminals (including the base station of the central control network) except for the first and second terminals is performed, an ad-hoc communication network is formed of wireless apparatuses provided in the terminals, and more stable communication becomes possible by communicating with the network.

In the above-mentioned embodiment, an example in which the first antenna 1 is exclusively used for reception has been described. However, the first antenna 1 may transmit the wireless signal. In this case, the wireless communication apparatus of FIG. 1 is constituted as shown in FIG. 15.

FIG. 15 has an input circuit 31, a modulation circuit 32, a frequency conversion & amplification circuit 33 and a sharing circuit 34, in addition to configurations of FIG. 1. The input circuit 31 supplies the input signal to be transmitted to the modulation circuit 32. The modulation circuit 32 performs a prescribed modulation processing for the input signal. The modulation signal is converted into an intermediate frequency and amplified by the frequency conversion & amplification circuit 33. The sharing circuit 34 switches transmission/reception of the first antenna 1.

FIG. 16 is a block diagram showing a detailed internal configuration of FIG. 15. FIG. 16 adds the input circuit 31, the modulation circuit 32, the frequency conversion & amplification circuit 33 and the sharing circuit 34, in addition to configurations of FIG. 3. The input circuit 31 is constituted of an information input circuit 35 and a signal processing circuit 36.

Figure 17:
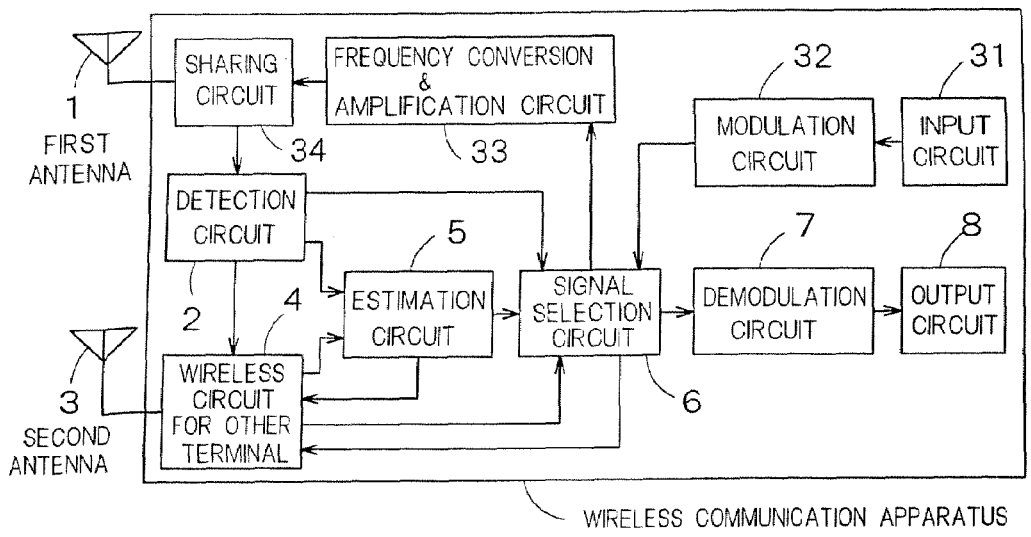
FIG. 17 is a block diagram in the case where a transmission circuit is added to the wireless communication apparatus of FIG. 10.
Figure 18:
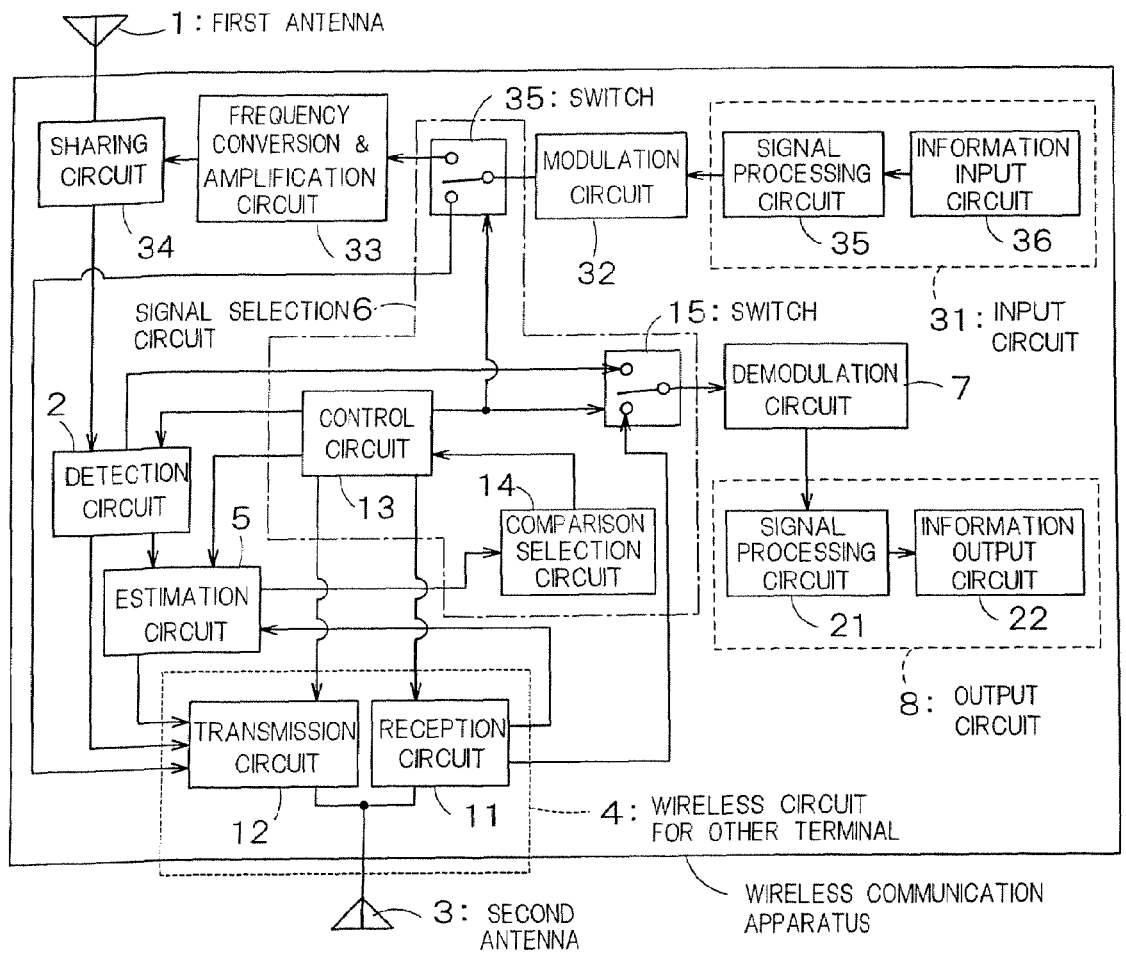
FIG. 18 is a detailed block diagram of FIG. 17.

FIG. 17 is a block diagram in the case where a transmission signal path is added to the wireless communication apparatus of FIG. 10. As compared with FIG. 10, the signal path which transmits the estimation result of the estimation circuit 5 to the wireless circuit for other terminal 4 is added. FIG. 18 is a detailed block diagram of FIG. 17. A signal path which transmits the estimation result of the estimation circuit 5 to the wireless circuit for other terminal 4 is added in FIG. 18, as compared with FIG. 11.

What is claimed is:

1. A wireless communication apparatus for communicating in an autonomous distributed wireless network, comprising:
   a detection unit which generates a detection signal by detecting a first wireless signal from a first wireless apparatus;
   a wireless circuit which receives a second wireless signal relating to said first wireless signal, transmitted from a second wireless apparatus which received said first wireless signal;
   a signal estimation unit which estimates said detection signal and the received second wireless signal;
   a signal selector which selects either said detection signal or the received second wireless signal, based on an estimation result of said signal estimation unit;
   a combination unit which combines said detection signal with the received second wireless signal;

a diversity switch which selects whether the detection signal and the second wireless signal are supplied to either of the signal selector or the combining unit; and a demodulator which demodulates either of the signal selected by said signal selector or the signal selected by the diversity switch.

2. The apparatus according to claim 1, further comprising:

a first antenna which receives said first wireless signal; and a second antenna which receives said second wireless signal.

3. The apparatus according to claim 1, further comprising:

an antenna capable of matching said first and second wireless signals in which frequency bands are different from each other; and a signal distributor which separates said first and second wireless signals received by said antenna, supplies said first wireless signal to said detection unit, and supplies said second wireless signal to said wireless circuit.

4. The apparatus according to claim 1, wherein said wireless circuit transmits said detection signal to said second wireless apparatus.

5. A method of wireless communication between a plurality of wireless apparatus in an autonomous distributed wireless network, comprising:

generating a detection signal by detecting a first wireless signal from a first wireless apparatus;

receiving a second wireless signal relating to said first wireless signal transmitted from a second wireless apparatus which received said first wireless signal;

estimating said detection signal and the received second wireless signal;

selecting either said detection signal or the received wireless signal, based on the estimation using a signal selector;

outputting information included in the selected wireless signal in the selecting;

combining said detection signal with the received second wireless signal in a combining unit;

selecting whether the detection signal and the second wireless signal are supplied to either of the signal selector or the combining unit using a diversity switch; and demodulating either of the signal selected by said signal selector or the signal selected by the diversity switch.

* * * * *